United States Patent
Takahashi et al.

(10) Patent No.: US 7,099,567 B2
(45) Date of Patent: Aug. 29, 2006

(54) VIDEO PROCESSING METHOD AND VIDEO PROCESSING APPARATUS

(75) Inventors: Toshiya Takahashi, Osaka (JP); Yoshinori Matsui, Nara (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 1127 days.

(21) Appl. No.: 09/838,175

(22) Filed: Apr. 20, 2001

(65) Prior Publication Data

US 2001/0055476 A1 Dec. 27, 2001

(30) Foreign Application Priority Data

Apr. 21, 2000 (JP) ............... 2000-120756

(51) Int. Cl.
*H04N 7/06* (2006.01)

(52) U.S. Cl. .................. 386/98; 386/105; 386/125

(58) Field of Classification Search ............ 386/46, 386/98, 104, 105, 106, 92, 109, 111, 112, 386/27, 33, 52, 55, 39, 54, 68, 75, 1, 45
See application file for complete search history.

(56) References Cited

U.S. PATENT DOCUMENTS 6,118,927 A * 9/2000 Kikuchi et al. ............ 386/95
6,314,234 B1 * 11/2001 Kawamura et al. ........ 386/95
6,539,166 B1 3/2003 Kawamura et al.
6,567,427 B1 * 5/2003 Suzuki et al. ............. 370/535

FOREIGN PATENT DOCUMENTS

| CN | 1136257 A | 11/1996 |
|---|---|---|
| EP | 0 696 798 | 2/1996 |
| EP | 0 790 739 | 8/1997 |
| EP | 0 944 087 | 9/1999 |
| WO | 99/38166 | 7/1999 |

\* cited by examiner

*Primary Examiner*—Robert Chevalier
(74) *Attorney, Agent, or Firm*—Wenderoth, Lind & Ponack, L.L.P.

(57) ABSTRACT

In a video processing method, plural pieces of digital data such as video and audio data are inputted together with an instruction signal indicating whether or not the plural pieces of digital data are to be multiplexed, and the plural pieces of digital data are multiplexed when the instruction signal indicates that the digital data are to be multiplexed. The multiplexed digital data are then outputted together with a flag indicating whether or not the digital data are multiplexed. Therefore, when video and audio data are not multiplexed or when there is a scene description for handling plural pieces of video data, the video and audio data can be recorded or transmitted in a like manner as multiplexed data.

11 Claims, 7 Drawing Sheets

Fig.3 (a)

```
           program #1
scene description flag = 0
   number of objects = n
       AV object ID = 1
    multiplexing flag = 1
       AV object ID = 2
    multiplexing flag = 1
```

```
           program #2
scene description flag = 0
   number of objects = m
       AV object ID = 1
    multiplexing flag = 0
       AV object ID = 2
    multiplexing flag = 0
```

```
           program #3
scene description flag = 1
  scene description ID = 1
   number of objects = 0
```

Fig.3 (b)

scene description #1

```
    ⋮
<video src="AV object #1">
<audio src="AV object #2">
    ⋮
```

VIDEO PROCESSING METHOD AND VIDEO PROCESSING APPARATUS

FIELD OF THE INVENTION

The present invention relates to a method and an apparatus for video processing, which are used for recording digital data such as video and audio data on a disk, a memory, or the like, and reproducing recorded digital data.

BACKGROUND OF THE INVENTION

With recent development in video and audio digitization, a standardization of recording and playback of compressed video and audio data in/from storage media has been promoted. A DVD is one of these standards. Although a DVD has conventionally been used for playback only, a video recording standard for recording video and audio data has been established since a recordable DVD has recently been put to practical use.

Hereinafter, a description will be given of a video recording standard that is discussed in "Transactions of the Institute of Image Information and Television Engineers, Vol. 53, No. 10, "Trends in Standardization of Optical Disk", Murase et al.", as an example of a conventional video processing method for video recording and playback, with reference to the drawings.

FIGS. 7(a)–7(d) are diagrams for explaining a video recording standard as an example of a conventional video recording/playback standard. FIG. 7(a) is a block diagram of a recording/playback apparatus, and FIGS. 7(b)–7(d) are diagrams for explaining a recorded video and audio format. In FIG. 7(a), reference numeral 71 denotes a codec unit for compressing video and audio data and multiplexing the compressed video and audio data, or for demultiplexing the compressed and multiplexed video and audio data and decompressing the video and audio data. Reference numeral 72 denotes a drive for recording the data that is generated in the codec unit 71 on a recording medium, or playing the data from the recording medium.

Hereinafter, the operation of the recording/playback apparatus will be described with reference to FIGS. 7(a)–7(d). Digitized video and audio data are supplied from the outside (i.e., externally supplied) to a video codec 711 and an audio codec 712, respectively, and are compressed. The compressed data are inputted to a multiplexer/demultiplexer 713. The data recorded by a DVD are constituted in units of Video Objects as shown in FIG. 7(b), and each Video Object corresponds to a program. Each Video Object is composed of plural Video Object Units as shown in FIG. 7(c), and each Video Object Unit is, for example, a random-accessible unit. Each Video Object Unit is further divided into Video Packs and Audio Packs as shown in FIG. 7(d). A Pack is a unit of actual disk recording and playback, such as 2048 bytes.

The multiplexer/demultiplexer 713 receives the inputted compressed video and audio data and divides them into Packs, assigns time information for synchronous reproduction to each Pack, and then, multiplexes Video Packs and Audio Packs as shown in FIG. 7(d) to output the result to the track buffer 714. Further, the data outputted from the track buffer 714 in the codec 71 are assigned with data for error correction by the error correction unit 721 in the drive 72, modulated by the modulator/demodulator 722, and are then recorded on the DVD-RAM disk 724. On the other hand, the data recorded on the DVD-RAM disk 724 are demodulated and error corrected according to a procedure that is reverse to that of the recording, and are inputted to the multiplexer/demultiplexer 713 through the track buffer 714. Because the inputted data are multiplexed so as to have a format of FIGS. 7(d)–7(d), data is demultiplexed with distinguishing between video and audio by referring to the headers, and the demultiplexed video and audio data are inputted to the video codec 711 and the audio codec 712, respectively, so as to be decompressed and played back.

In the conventional video processing apparatus constructed as described above, the compressed and multiplexed data, which are recorded so as to have a predetermined format, are demultiplexed into video data and audio data and they are played back, thereby performing data recording/playback complying with the video recording standard. However, the construction shown in FIG. 7(a) which operates so as to have formats as shown in FIGS. 7(b)–7(d) has the following two drawbacks.

Firstly, the formats of data which are to be recorded onto a DVD necessarily carries out multiplexing of video and audio as shown in FIG. 7(d). However, carrying out multiplexing of video and audio would be a large load when high-speed data processing is required. In recent years, with the reduction in costs of semiconductor memories, a medium that can perform high-speed data inputting and outputting differently from a DVD, has been recognized as a storage medium. When using a medium such as semiconductor memories which perform high-speed data inputting and outputting, the processing which have been carried out in case of employing a DVD, i.e., multiplexing video data and audio data and alternately recording those on tracks, and reading them by tracing the tracks with a pick-up at a fixed rate, are not required and, moreover, data that are recorded at an arbitrary position on the medium can be taken by employing random access accessing. Thus, data are not necessarily required to be multiplexed, and video and audio data can be apparently simultaneously inputted or outputted. Among multimedia data that are transmitted through the Internet, we can find many of them performing no multiplexing of video and audio data. In view of this, multiplexing and demultiplexing at recording are nothing but applying load to equipment.

Secondly, in MPEG4 (the standard for compression of moving pictures as established by the ISO/IEC in 1999), a plurality of video and audio data can be handled in one program. Then, which video or which audio data are to be played at which position and at which time are expressed by data called "scene description". In this case, the data to be played are determined by the content of the scene description, and therefore, it was impossible to multiplex plural pieces of video and audio data at predetermined intervals as in the conventional video processing.

SUMMARY OF THE INVENTION

The present invention is made to solve the above-described problems. Accordingly, an object of the present is to provide a method and an apparatus for video processing that can record or transmit video and audio data without multiplexing, as required.

Other objects and advantages of the present invention will become more apparent from the following detailed description. The detailed description and specific embodiments described herein are provided only for illustration since various additions and modifications within the scope of the present invention will be apparent to those of skill in the art from the detailed description.

According to a first aspect of the present invention, a video processing method comprises: receiving plural pieces of digital data such as video and audio data, and an instruction signal indicating whether or not the plural pieces of digital data are to be multiplexed; multiplexing the plural pieces of digital data when the instruction signal indicates that the digital data are to be multiplexed; and outputting the multiplexed digital data, and a flag indicating whether or not the digital data are multiplexed. Since whether the video and audio data are multiplexed or not can be discriminated by the flag, video and audio data are not necessarily multiplexed at recording, whereby recording and playback of video and audio data can be performed separately. Therefore, the load to equipment by multiplexing and demultiplexing at recording can be reduced.

According to a second aspect of the present invention, a video processing method comprises: receiving plural pieces of digital data such as video and audio data, and scene description data indicating the playback times or playback positions of the respective digital data; setting a scene description flag indicating whether or not there a scene description is present; and outputting the digital data and the scene description flag. In this method, since whether there is a scene description or not is discriminated by the flag, and when there is a scene description, data recording/playback is performed with reference to the scene description. Therefore, even when plural pieces of video and audio data are included in a program as in MPEG4 data, the load to equipment by multiplexing and demultiplexing can be reduced.

According to a third aspect of the present invention, the video processing method of the first aspect further comprises: generating access information for making an access to the digital data at an arbitrary time and at an arbitrary position; and outputting the digital data accessed and the access information. Therefore, it is easy to make access to arbitrary data of video and audio data which are compressed by coding such as MPEG coding.

According to a fourth aspect of the present invention, the video processing method of the second aspect further comprises: generating access information for making an access to the digital data at an arbitrary time and at an arbitrary position; and outputting the digital data accessed and the access information. Therefore, it is easy to make access to arbitrary data of video and audio data which are compressed by coding such as MPEG coding.

According to a fifth aspect of the present invention, a video processing apparatus comprises: audio coding means for coding audio data; video coding means for coding video data; and multiplexing means for receiving plural pieces of coded digital data, and an instruction signal indicating whether or not the plural pieces of digital data are to be multiplexed, multiplexing the plural pieces of digital data when the instruction signal indicates that the digital data are to be multiplexed, and outputting the multiplexed digital data and a flag indicating whether or not the digital data are multiplexed. Since whether video and audio data are multiplexed or not can be discriminated by the flag, video and audio data are not necessarily multiplexed at recording, whereby recording and playback of video and audio data can be performed separately. Therefore, the load to equipment by multiplexing and demultiplexing at recording can be reduced.

According to a sixth aspect of the present invention, a video processing method comprises: receiving plural pieces of digital data such as video and audio data, and a flag indicating whether or not the plural pieces of digital data are multiplexed; demultiplexing the plural pieces of digital data when the flag indicates that the digital data are multiplexed; and outputting the demultiplexed digital data, respectively. Therefore, it is possible to easily read and play data from a single recording medium in which both of multiplexed digital data and not-multiplexed digital data are included.

According to a seventh aspect of the present invention, a video processing method comprises: receiving plural pieces of digital data such as video and audio data, and a scene description flag indicating whether or not there is scene description data that indicate the playback times or playback positions of the respective digital data; and outputting the digital data and the scene description data when the scene description flag indicates that there is scene description data. Therefore, even when plural pieces of video and audio are included in a program as in MPEG4 data, the load to equipment by multiplexing and demultiplexing can be reduced.

According to an eighth aspect of the present invention, a video processing apparatus comprises: audio decoding means for decoding digitized audio data; video decoding means for decoding digitized video data; and demultiplexing/control means for detecting a flag indicating whether or not the plural pieces of digital data are multiplexed, demultiplexing the plural pieces of digital data when the flag indicates that the digital data are multiplexed, and controlling the audio decoding means and the video decoding means so as to output the plural pieces of digital data separately. Therefore, it is possible to easily read and play data from a single recording medium in which both of multiplexed digital data and not-multiplexed digital data are included.

According to a ninth aspect of the present invention, a video processing apparatus comprises: audio coding means for coding audio data; video coding means for coding video data; multiplexing means for receiving the plural pieces of coded digital data and an instruction signal indicating whether or not the plural pieces of digital data are to be multiplexed, multiplexing the plural pieces of digital data when the instruction signal indicates that the digital data are to be multiplexed, and outputting the multiplexed digital data and a flag indicating whether or not the digital data are multiplexed; and data recording means for recording the multiplexed digital data and the flag indicating whether or not the digital data are multiplexed onto the same recording medium. Since whether video and audio data are multiplexed or not can be discriminated by the flag, video and audio data are not necessarily multiplexed at recording and, therefore, it is possible to create a recording medium in which multiplexed digital data and non-multiplexed digital data are included.

According to a tenth aspect of the present invention, there is provided a data recording medium containing a video processing program for making a computer execute a process of recording plural pieces of digital data such as video and audio data onto the same recording medium. The video processing program of the tenth aspect comprises: receiving plural pieces of digital data such as video and audio data, and an instruction signal indicating whether or not the plural pieces of digital data are to be multiplexed; multiplexing the plural pieces of digital data when the instruction signal indicates that the digital data are to be multiplexed; outputting the multiplexed digital data and a flag indicating whether or not the digital data are multiplexed; and recording the outputted multiplexed digital data and the flag indicating whether or not the digital data are multiplexed onto the same recording medium. Therefore, it is possible to realize, by software, a video processing method that can reduce the load to equipment by multiplexing and demultiplexing at recording.

According to an eleventh aspect of the present invention, there is provided a data recording medium containing a video processing program for making a computer execute a process of recording plural pieces of digital data such as video and audio data onto the same recording medium. The video processing program of the eleventh aspect comprises: reading plural pieces of digital data such as video and audio data, and a flag indicating whether or not the plural pieces of digital data are multiplexed; judging whether or not the plural pieces of digital data are multiplexed based on the flag; and demultiplexing the plural pieces of digital data when it is judged that the plural pieces of digital data are multiplexed, and separately outputting the obtained respective digital data. Therefore, it is possible to realize, by software, a video processing method for reading and playing data from a single recording medium in which multiplexed digital data and non-multiplexed digital data are included.

According to a twelfth aspect of the present invention, there is provided a data recording medium containing plural pieces of digital data such as video and audio data, and multiplexing flags corresponding to the respective digital data and indicating whether or not the respective digital data are multiplexed. Therefore, it is possible to realize a recording medium that can reduce the load to equipment when multiplexed data is demultiplexed.

According to a thirteenth aspect of the present invention, there is provided a data structure for recording coded video and audio signals that are obtained by coding digital video and audio signals, where the data structure comprises plural pieces of digital data such as video and audio data, and multiplexing flags indicating whether or not the respective digital data are multiplexed.

BRIEF DESCRIPTION OF THE DRAWINGS

FIGS. 3(a) and 3(b) are diagrams for explaining the contents of management information of the recording format shown in FIG. 2.

DETAILED DESCRIPTION OF THE PREFERRED EMBODIMENTS

Hereinafter, a video processing method and a video processing apparatus according to an embodiment of the present invention will be described with reference to the drawings.

Figure 1:
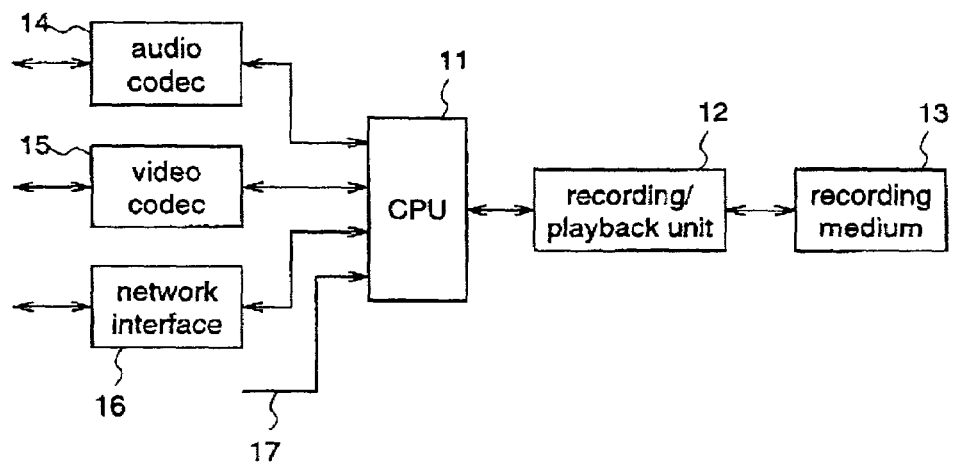
FIG. 1 is a block diagram illustrating the construction of a video processing apparatus according to an embodiment of the present invention.
Figure 2:
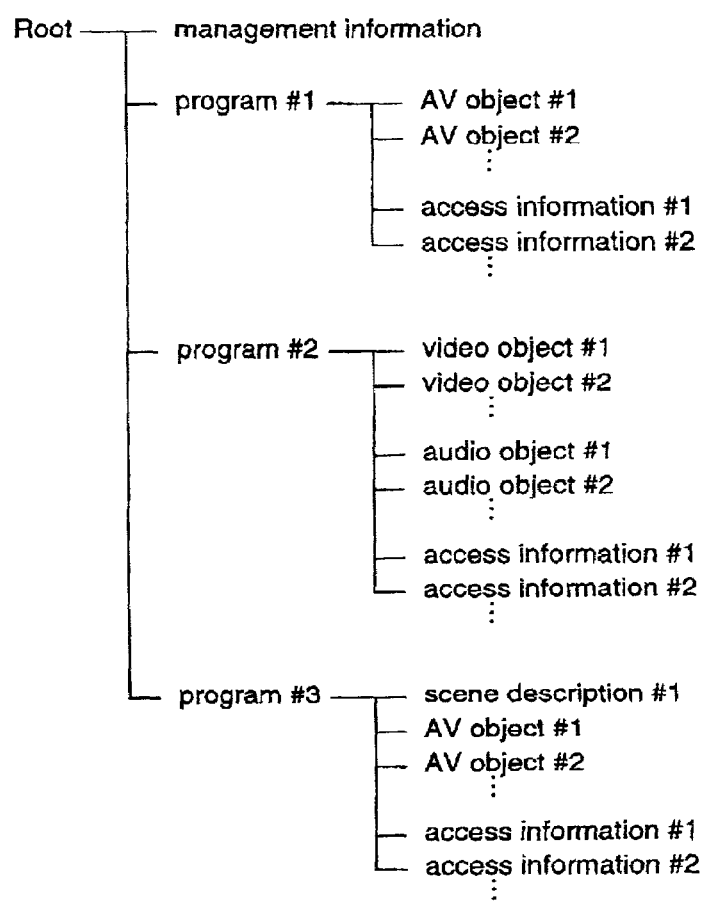
FIG. 2 is a diagram for explaining a recording format on a recording medium that is processed by the video processing apparatus shown in FIG. 1.
Figure 4:
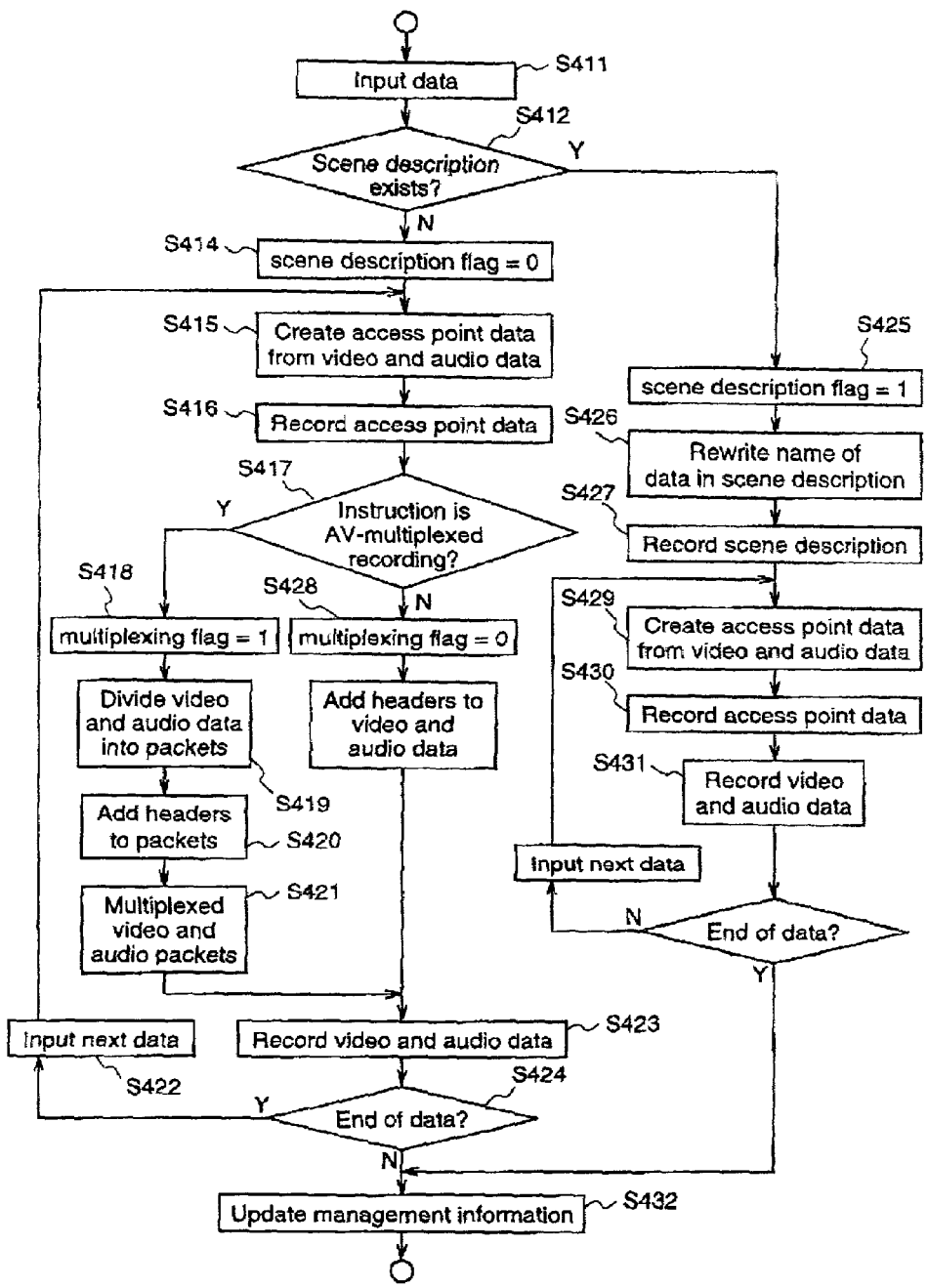
FIG. 4 is a flowchart for explaining the operation of a CPU at recording, which CPU is one of the components of the video processing apparatus shown in FIG. 1.
Figure 5:
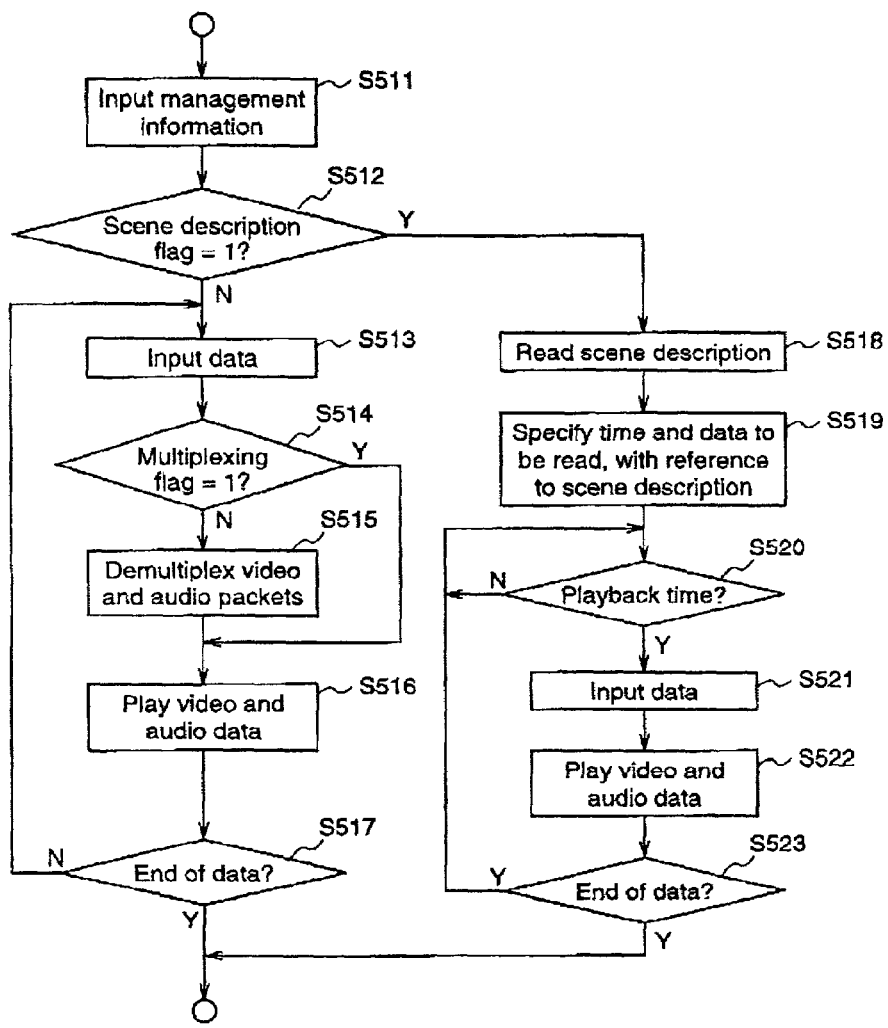
FIG. 5 is a flowchart for explaining the operation of the CPU at playback.

FIG. 1 is a block diagram illustrating a video processing apparatus according to the embodiment of the present invention. In FIG. 1, reference numeral 11 denotes a multiplexing control unit as a multiplexing means for multiplexing plural pieces of digital data such as video and audio, and for demultiplexing the multiplexed data into the respective data. This multiplexing control unit 11 is implemented by a CPU. Reference numeral 12 denotes a recording/playback unit for performing recording and playback, reference numeral 13 denotes a recording medium, reference numeral 14 denotes an audio codec as an audio coding (decoding) means, reference numeral 15 denotes a video codec as a video coding (decoding) means, and reference numeral 16 denotes a network interface. Further, reference numeral 17 denotes a flag indicating whether or not data is multiplexed, and this flag 17 is inputted from the outside by the user. FIGS. 2 and 3 are diagrams for explaining a recording format according to the embodiment of the present invention, FIG. 4 is a flowchart illustrating the operation of the CPU 11 at recording, and FIG. 5 is a flowchart illustrating the operation of the CPU 11 at playback.

Hereinafter, a video recording/playback method, as video processing, will be described with reference to FIGS. 1 to 5, by taking the video processing apparatus shown in FIG. 1 as an example.

FIG. 2 shows a data format on a recording medium. With reference to FIG. 2, video and audio data are managed in units of programs, and a plurality of programs can be recorded on a single recording medium. Besides the programs, information for managing the whole of the programs in the recording medium is recorded on the recording medium. Each program is composed of data having a predetermined size, which is called an object. In the case of shooting with a video camera, an object corresponds to video or audio that is shot from when the shooting is started to when the shooting is ended, and a program corresponds to video or audio that is shot from when the video camera is powered on to when the video camera is powered off. Of course, one program may be composed of one object, and only one program may be recorded on one recording medium. In FIG. 2, three programs #1, #2, and #3 are recorded on one recording medium. In the program #1, video and audio objects are multiplexed (AV objects). In the program #2, video and audio objects are not multiplexed, i.e., video objects and audio objects are recorded as separated objects. In the program #3, it is uncertain whether video and audio objects are multiplexed or not, and scene description data is recorded in addition to the video and audio data. Further, in FIG. 2, access information used for random access is recorded in addition to the video and audio data.

FIG. 3(a) shows an example of the contents of the management information shown in FIG. 2. The management information is divided into program units, and each program has management information for each object. An object ID is a number to identify an object, and one object ID is associated with each recorded object. Each program has a scene description flag, and each object has a multiplexing flag. The scene description flag indicates whether or not the program is managed by a scene description, and when the scene description flag is "1", scene description data surely exists in this program. The multiplexing flag indicates whether or not video and audio are multiplexed in each recorded object. In the example of FIG. 3, since the scene description flag is "0" in the program #1, no scene description exists in this program. Since the multiplexing flag corresponding to each object is "1" in the program #1, video and audio data are multiplexed.

Further, since the multiplexing flags are "0" in the program #2, video and audio data are separately recorded in this program. In the program #1, there is only one AV object ID even though video and audio data are not multiplexed. The reason is as follows. Since video and audio data can be distinguished from each other by extensions of files or the like, video and audio data can be managed with one AV object ID, whereby the amount of data of the management information can be reduced. Of course, the method of describing AV object ID is not restricted thereto, and plural pieces of AV object ID corresponding to data that is required for synchronous reproduction may be listed in the management information.

In the program #3, since the scene description flag is "1", a scene description ID follows the scene description flag. An example of a scene description is shown in FIG. 3(b). As shown in FIG. 3(b), the scene description describes when (time) and where (position) the corresponding data should be played. Accordingly, data to be played can be determined with reference to the scene description. Further, although, in the management information, the number of objects constituting each program is recorded, the number of objects is zero when there is a scene description. The reason is as follows. Since all objects are managed by the scene description, only the scene description is altered even when the number of objects is changed by editing or the like, whereby the load of editing the whole management information is reduced.

Next, a method for recording data in the format shown in FIGS. 2 and 3 will be described with reference to FIGS. 1 and 4. In FIG. 1, the audio codec 14 and the video codec 15 compress inputted audio and video data, respectively, like the conventional ones. When the compressed data are inputted to the CPU 11 (step S411), the CPU 11 checks whether or not a scene description is inputted (step S412). When there is no scene description, the CPU 11 sets the scene description flag at 0 (S414), and generates access information for random access (step S415). The information for random access is, in the case of MPEG video compression, the number of data, the number of frames, or the time up to an intra-frame coded frame. In the case of audio data, the information for random access is the audio frame number corresponding to the access point of video, or the number of frames up to the audio frame. However, the information for random access is not restricted to those mentioned above, and any information (amount of data, numeric value, etc.) serving as an index of access may be used. Then, the process proceeds to step S416, wherein recording of access point data is carried out.

Next, in step S417, it is judged whether or not the video and audio data are to be multiplexed at recording. When the program #1 indicates AV-multiplexed recording (refer to step S418), the compressed video and audio data are divided into packets of a predetermined length (step S419), and information such as synchronous reproduction or the like is assigned to the video and audio data for each predetermined length packet (step S420). Next, the video and audio packets are multiplexed and transmitted to the recording/playback unit 12 (step S421), and recorded on the recording medium 13 together with the management information and the access information (step S423). The processes of steps S415 to S423 are repeated until the end of data is detected in step S424. When the end of data is detected, the management information is updated (step S432) to conclude the data processing.

On the other hand, when there is no scene description data and it is judged in step S417 that AV multiplexing should not be performed, the multiplexing flag is set at 0 (step S428), and the video and audio data are assigned with information for synchronization and then transmitted to the recording/playback unit 12. When there is scene description data, the name of reference data in the scene description data is rewritten so that the name of the video and audio data written in the scene description data coincides with the name of the data to be recorded (step S426). Thereafter, access information is generated (step S429), the data are assigned with information for synchronization, and then transmitted to the recording/playback unit 12. Further, with respect to the management information shown in FIG. 3(a), the CPU 11 generates a scene description flag and a multiplexing flag corresponding to each program and each object simultaneously with data processing, and records these flags in the field of management information, together with the number of objects, the object ID, and the like (step S432). By the operation mentioned above, the video and audio data having the format shown in FIGS. 2 and 3 are recorded.

Next, a method for playing the data recorded with the format shown in FIGS. 2 and 3 will be described with reference to FIGS. 1 and 5. Since, in the format shown in FIG. 2, it is premised that playback is carried out in units of programs, the procedure for playing one program will be described hereinafter.

Initially, in step S511, the management information of the program is read. Then, it is judged whether or not there exists a scene description, by the scene description flag in the management information (step S512).

When there is no scene description, the data are inputted in step S513, and it is judged whether or not the data are multiplexed by the multiplexing flag (step S514). When it is judged that the data are multiplexed, the multiplexed data are demultiplexed into video data and audio data (step S515), and the respective data are transmitted to the corresponding codecs (step S516) to be played synchronously according to the information for synchronization attached to the headers. Thereafter, the processes of steps S513 to S516 are repeated until the end of data is detected in step S517. On the other hand, when it is judged in step S514 that the video data and the audio are not multiplexed, step S515 is bypassed, and the respective data are transmitted to the corresponding codecs together with the information for synchronization (step S516).

On the other hand, when it is judged in step S512 that there is a scene description (i.e., the screen description flag is "1"), the scene description is reproduced in step S518, and the playback times of the respective data and the data to be played are specified from the scene description (step S519). When it is judged in step S520 that the time to play the data has come, the data is inputted in step S512, and the data is played in step S522. However, since whether or not the video data and the audio data are multiplexed is usually judged by the information of the scene description, demultiplexing is performed when the video and audio data are multiplexed. When the video and audio data are not multiplexed, the respective data are transmitted to the corresponding codecs together with the information for synchronization. It does not matter whether the video data and the audio data described in the scene description are multiplexed or not. When the video data and the audio data are not multiplexed, the respective data are separately transmitted to the video and audio codecs. Since the order of data to be played is also specified in the scene description, the recorded video and audio data are played according to the specified order. Thereafter, the processes of steps S520 to S522 are repeated until the end of data is detected in step S523. Through the procedure mentioned above, the recorded video and audio can be played whether they are multiplexed or not and, moreover, the recorded video and audio can also be played when there is a scene description.

Figure 6:
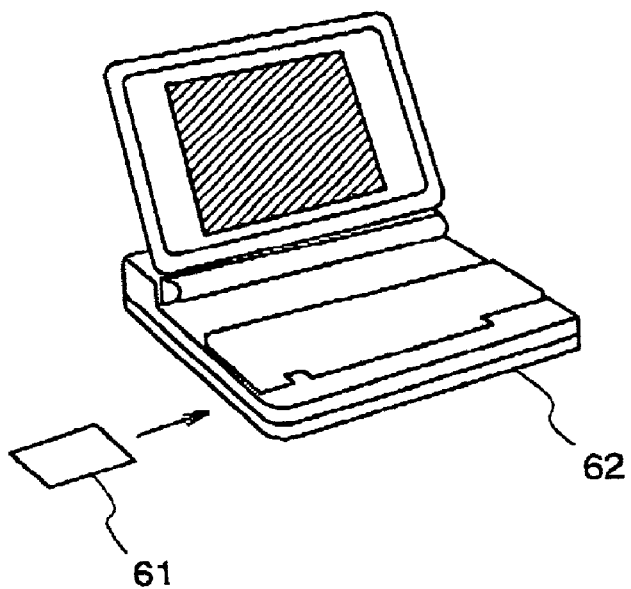
FIG. 6 is a diagram for explaining a recording medium, in which a program and data for implementing the video processing apparatus with a computer are recorded, and a computer system.
Figure 7:
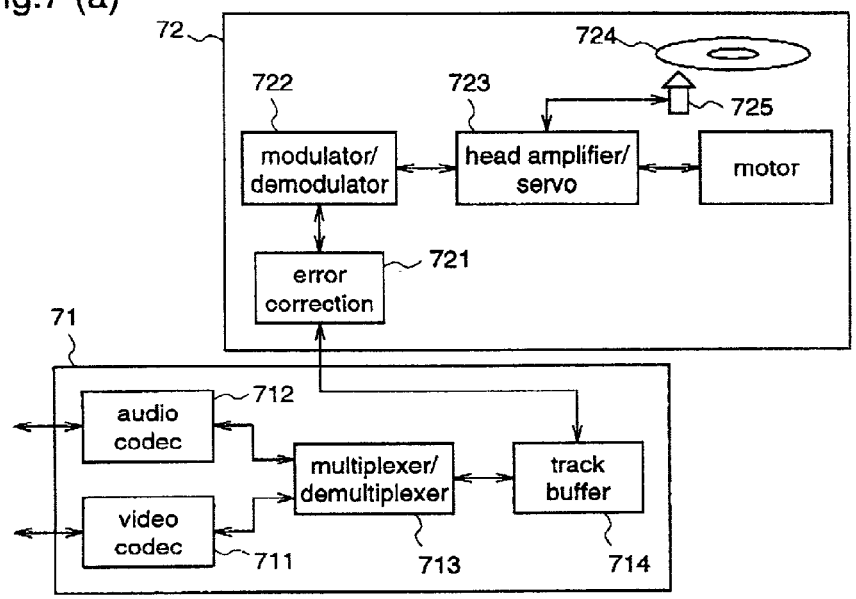
FIGS. 7(a)–7(d) are diagrams for explaining a video recording standard as an example of a conventional video recording/playback standard.
Figure 7:
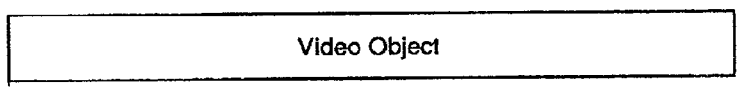
Figure 7:
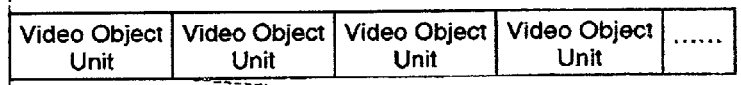
Figure 7:
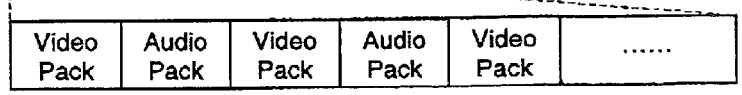

FIG. 6 is a diagram illustrating a recording medium 61 on which a program and data for making a computer execute the video processing according to the present invention are recorded, and a computer system 62. A semiconductor memory card is assumed as the recording medium 61. It is possible to make the computer system 62 execute the procedures shown in FIGS. 4 and 5 by programming the procedures and storing the resultant program in the recording medium 61. Further, the same effects as those described for the embodiments of the invention are achieved by writing the data itself in the recording medium 61, and playing that data.

While a semiconductor memory is used in the above description as the data recording medium 61, other media may be used, for example, a disk like a floppy disk, a CD, or a DVD, or a medium provided with a recording element, like an IC card.

Further, while file management is explained in units of programs and objects in the embodiment of the present invention, the present invention is not restricted thereto, and video and audio may be recorded as they are, without being divided into units of programs.

Further, while each program is associated with a scene description flag in the embodiment of the present invention, the present invention is not restricted thereto, and each object may be associated with a scene description flag. In this case, a scene description object corresponding to each object exists in association with the flag. Further, in the above description, it is judged for each program whether or not video and audio data are to be multiplexed. In this case, a multiplexing flag may be assigned not to each object but to each program. Conversely, when a multiplexing flag is assigned to each object, it is possible to mix multiplexed data and non-multiplexed data for each object in the same program.

Furthermore, while one piece of video data and one piece of audio data are multiplexed in the embodiment of the present invention, it is also possible to extend the present invention so that plural pieces of video data and plural pieces of audio data are multiplexed.

Furthermore, while video processing is described for the case of recording and playing data on/from a recording medium in the embodiment of the present invention, the present invention is not restricted thereto. For example, in FIG. 1, the recording/playback unit 12 may be replaced with a transmission line interface, and the video processing apparatus may be placed in the middle of the transmission line to perform multiplexing/demultiplexing of transmitted data, addition of flags, and the like. Furthermore, although video and audio data are described with respect to only being input and output to/from the codecs, a network interface 16 may be added to the structure of FIG. 1 so that video and audio data can be transmitted to or received by the network.

Furthermore, while the CPU 11 in the embodiment of the present invention performs multiplexing/demultiplexing of video and audio data, addition of multiplexing flags and scene description flags, and judgement of the contents, the present invention is not restricted thereto. The multiplexing/demultiplexing unit may be constituted by hardware, or the respective components may be implemented by different CPUs. Thus, the hardware construction is not limited on a condition that the same operation as described above is achieved.

What is claimed is:

1. A video processing method comprising:
   receiving plural pieces of digital data including at least one of video and audio data, and an instruction signal indicating whether the plural pieces of digital data are to be multiplexed or are to be demultiplexed and outputted;
   multiplexing the plural pieces of digital data, and outputting the multiplexed digital data and a flag indicating whether or not the digital data are multiplexed, when the instruction signal indicates that the digital data are to be multiplexed; and
   adding information for synchronization to the plural pieces of digital data without multiplexing the digital data, and outputting the digital data having the information for synchronization added thereto, when the instruction signal indicates that the digital data are to be demultiplexed and outputted.

2. The video processing method of claim 1, further comprising:
   receiving plural pieces of digital data including at least one of video and audio data, and scene description data indicating the respective playback times or playback positions of the digital data;
   setting a scene description flag indicating whether or not there is a scene description; and
   outputting the digital data and the scene description flag.

3. The video processing method of claim 1, further comprising:
   generating access information for making an access to the digital data at an arbitrary time or at an arbitrary position; and
   outputting the accessed digital data and the access information.

4. The video processing method of claim 2, further comprising:
   generating access information for making an access to the inputted digital data at an arbitrary time or at an arbitrary position; and
   outputting the accessed digital data and the access information.

5. A video processing apparatus comprising:
   audio coding means for coding digital audio data;
   video coding means for coding digital video data; multiplexing means for receiving plural pieces of coded digital data and an instruction signal indicating whether or not the plural pieces of digital data are to be multiplexed or are to be demultiplexed and outputted, multiplexing the plural pieces of digital data when the instruction signal indicates that the digital data are to be multiplexed, and outputting the multiplexed digital data and a flag indicating whether or not the digital data are multiplexed; and
   outputting means for adding information for synchronization to the plural pieces of digital data without multiplexing the digital data, and outputting the digital data having the information for synchronization added thereto, when the instruction signal indicates that the digital data are to be demultiplexed and outputted.

6. A video processing method comprising:
   receiving plural pieces of digital data including at least one of video and audio data, a multiplexing flag indicating whether or not the plural pieces of digital data are multiplexed, and a scene description flag indicating whether or not there is scene description data that indicate the respective playback times or playback positions of the digital data;

outputting the digital data and the scene description data when the scene description flag indicates that there is scene description data; and demultiplexing the plural pieces of digital data, and outputting the demultiplexed digital data respectively, when the multiplexing flag indicates that the digital data are multiplexed.

7. A video processing apparatus comprising:

audio decoding means for decoding digitized audio data;

video decoding means for decoding digitized video data; and demultiplexing/control means for detecting a multiplexing flag indicating whether or not the plural pieces of digital data are multiplexed, and when the multiplexing flag indicates that the digital data are multiplexed, demultiplexing the plural pieces of digital data and controlling said audio decoding means and said video decoding means so as to output the plural pieces of digital data separately, and detecting a scene description flag indicating whether there is scene description data that indicate the respective playback times or playback positions of the digital data, and when the scene description flag indicates that there is scene description data, controlling said audio decoding means and said video decoding means so as to output the digital data and the scene description data.

8. A video processing apparatus comprising:

audio coding means for coding digital audio data;

video coding means for coding digital video data; and data recording means for receiving plural pieces of coded digital data and an instruction signal indicating whether the plural pieces of digital data are to be multiplexed or are to be demultiplexed and outputted, multiplexing the plural pieces of digital data, and recording the multiplexed digital data and a flag indicating that the digital data are multiplexed onto the same recording medium, when the instruction signal indicates that the digital data are to be multiplexed, and adding information for synchronization to the plural pieces of digital data without multiplexing the digital data, and recording the digital data having the information for synchronization added thereto onto one recording medium, when the instruction signal indicates that the digital data are to be demultiplexed and outputted.

9. A computer-readable recording medium having a video processing program stored thereon for making a computer execute a process of recording plural pieces of digital data including at least one of video and audio data onto the same recording medium, said video processing program comprising:

a first program segment for receiving plural pieces of digital data including at least one of video and audio data, and an instruction signal indicating whether the plural pieces of digital data are to be multiplexed or are to be demultiplexed and outputted;

a second program segment for multiplexing the plural pieces of digital data when the instruction signal indicates that the digital data are to be multiplexed;

a third program segment for outputting the multiplexed digital data, and a flag indicating whether or not the digital data are multiplexed or not when the instruction signal indicates that the digital data are to be multiplexed;

a fourth program segment for recording the outputted multiplexed digital data and the flag indicating whether or not the digital data are multiplexed onto the same recording medium when the instruction signal indicates that the digital data are to be multiplexed; and a fifth program segment for adding information for synchronization to the plural pieces of digital data without multiplexing the digital data, and recording the digital data having the information for synchronization added thereto onto one recording medium, when the instruction signal indicates that the digital data are to be demultiplexed and outputted.

10. A computer-readable recording medium having a video processing program stored thereon for making a computer execute a process of recording plural pieces of digital data including at least one of video and audio data onto the same recording medium, said video processing program comprising:

a first program segment for reading plural pieces of digital data including at least one of video and audio data, and a multiplexing flag indicating whether or not the plural pieces of digital data are multiplexed;

a second program segment for judging whether or not the plural pieces of digital data are multiplexed based on the multiplexing flag;

a third program segment for demultiplexing the plural pieces of digital data when said second program segment judges that the plural pieces of digital data are multiplexed, and outputting the respective obtained digital data separately;

a fourth program segment for receiving plural pieces of digital data including at least one of video and audio data, and a scene description flag indicating whether there is scene description data that indicate the respective playback times or playback positions of the digital data;

a fifth program segment for judging whether there is the scene description data based on the scene description flag; and a sixth program segment for outputting the digital data and the scene description data when said fifth program segment judges that there is scene description data.

11. A respective computer-readable recording medium operable to be accessed by a computer and having stored thereon plural pieces of digital data including at least one of video and audio data, multiplexing flags corresponding to the respective digital data and indicating whether or not the respective digital data are multiplexed, and a scene description flag indicating whether there is scene description data that indicate the playback times or playback position of the digital data.

* * * * *